(12) United States Patent
Yoshida et al.

(10) Patent No.: US 7,679,784 B2
(45) Date of Patent: Mar. 16, 2010

(54) REFERENCE TONE SETTINGS FOR MONOTONE IMAGES

(75) Inventors: Seishin Yoshida, Nagano-ken (JP); Kazumichi Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 917 days.

(21) Appl. No.: 11/377,330

(22) Filed: Mar. 17, 2006

(65) Prior Publication Data
US 2006/0244984 A1  Nov. 2, 2006

(30) Foreign Application Priority Data
Mar. 18, 2005 (JP) .............. 2005-079244

(51) Int. Cl.
*G06F 15/00* (2006.01)
(52) U.S. Cl. ........................ 358/1.9; 358/518
(58) Field of Classification Search ........... 358/1.1–1.9, 358/518
See application file for complete search history.

(56) References Cited

U.S. PATENT DOCUMENTS

H001506 H * 12/1995 Beretta .................. 345/591

6,880,915 B2 * 4/2005 Shimada ................. 347/43
2003/0053094 A1 * 3/2003 Ohga et al. ............... 358/1.9

FOREIGN PATENT DOCUMENTS

| JP | 9-164705 A | 6/1997 |
|---|---|---|
| JP | 11-196285 A | 7/1999 |
| JP | 2000-177150 A | 6/2000 |
| JP | 2002-331693 A | 11/2002 |
| JP | 2002-337323 A | 11/2002 |
| JP | 2003-143422 A | 5/2003 |
| JP | 2004-142423 A | 5/2004 |
| JP | 2004-274476 A | 9/2004 |

* cited by examiner

*Primary Examiner*—Benny Q Tieu
*Assistant Examiner*—Michael Tzeng
(74) *Attorney, Agent, or Firm*—Sughrue Mion, PLLC

(57) ABSTRACT

A tone setting screen that includes a tone specifying area 110 for specifying a color tone of a monotone image using a single specification point is disclosed. A monotone image tone is determined according to the position of the specification point specified in the tone specifying area 110. The tone specifying area 110 is defined on the a* b* plane in the L*a*b* color space, where three reference tone points Pneutral, Pwarm, and Pcool, for the neutral, warm, and cool tones are disposed linearly in advance in the tone specifying area 110.

18 Claims, 7 Drawing Sheets

Reference tone settings on the color circle 110 (L*=40)

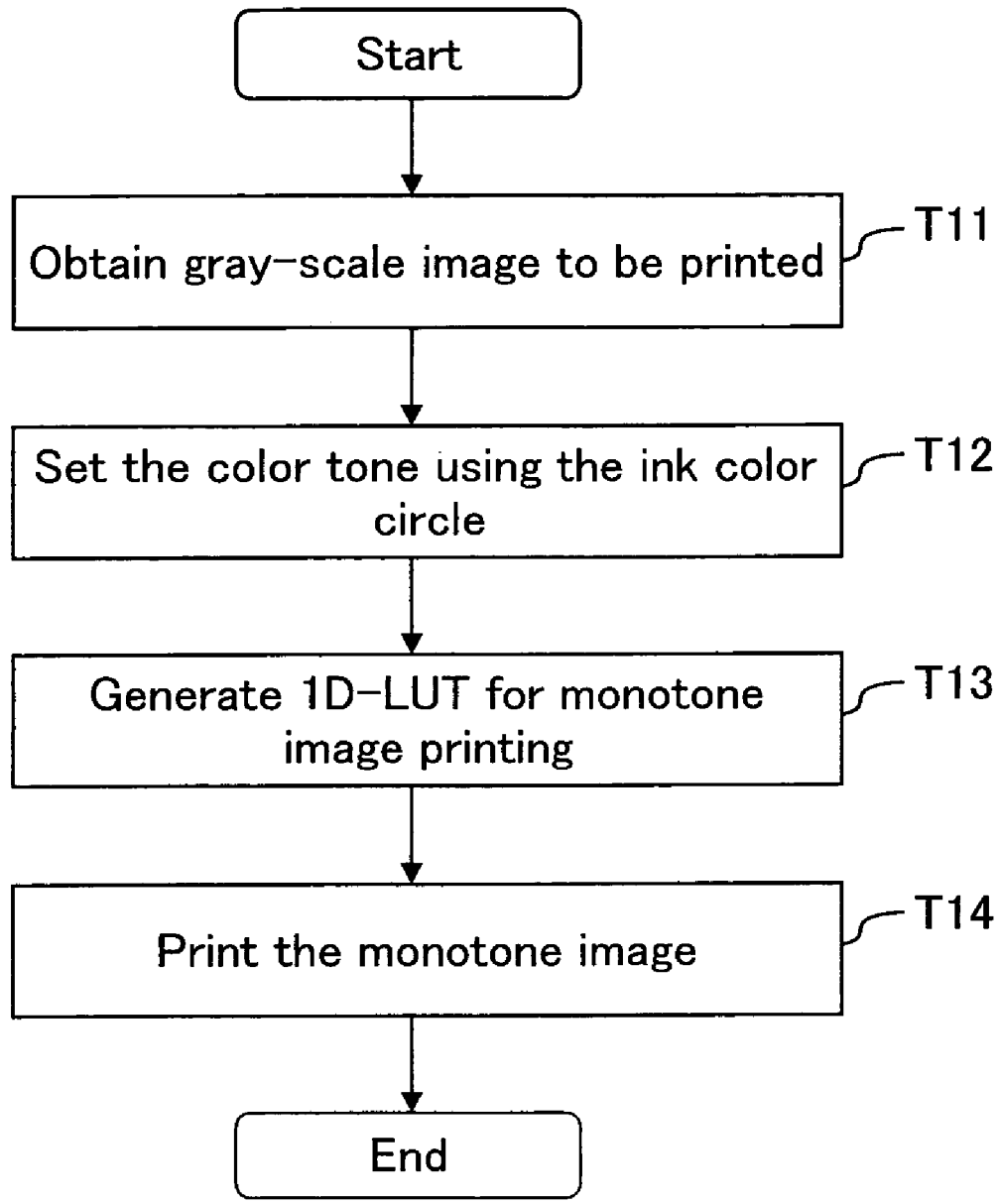

Image to be printed

Tone setting

Reference 1D-LUT 412

1D-LUT 413 for monotone image printing $C' = C \times Ck$
$M' = M \times Mk$
$Y' = Y \times Yk$ Monotone image print Reference tone settings on the color circle 110 (L*=40)

Monotone image reference tones when printing on a light blue print medium (L*=40)

Neutral tone reproduction on a light blue print medium (varying with the values of L*)

Monotone image reference tones when printing on a light yellow print medium (L*=40)

Neutral tone reproduction on a light yellow print medium (varying with the values of L*)

REFERENCE TONE SETTINGS FOR MONOTONE IMAGES

CROSS-REFERENCE TO RELATED APPLICATIONS

The present application claims the priority based on Japanese Patent Application No. 2005-79244 filed on Mar. 18, 2005, the disclosure of which is hereby incorporated by reference in its entirety.

BACKGROUND OF THE INVENTION

1. Field of the Invention

The present invention relates to techniques for setting reference tones for monotone images.

2. Description of the Related Art

A variety of printing processes, such as color printing and monotone printing, can be performed using inkjet printers. Monotone printing includes "monochrome printing" in a narrow sense that reproduces images using only gray scales, and "monotone printing" in a narrow sense that reproduces images with the addition of a color tone or a tint aside from gray. Note that in the present specification, the words "monotone printing" is used to have a broad meaning that includes the narrow meaning of "monochrome printing" unless otherwise indicated. Technologies for printing monotone images are disclosed in, for example, JPH11-196285A, JP2002-331693A, JP2002-337323A, and JP2004-142423A.

A variety of color tones are used as monotone image tones, such as a neutral tone, a warm tone, a cool tone, and a sepia tone. However, there has not been so much devised a technique of setting desirable reference tones for monotone images.

SUMMARY OF THE INVENTION

An object of the present invention is to provide a technology for setting reference tones so as to enable printing desirable monotone images.

In an aspect of the present invention, there is provided a method for setting a color tone for use in printing a monotone image. The method comprises the steps of (a) displaying a tone setting screen that includes a tone specifying area for specifying a color tone for a monotone image with a single specification point; and (b) setting the color tone of the monotone image according to the position of the specification point which is specified in the tone specifying area. The tone specifying area is defined on an a*-b* plane in L*a*b* color space, and the tone specifying area includes three reference tone points representing a warm tone, a neutral tone, and a cool tone, which are disposed linearly in advance within the tone specifying area.

This method enables reproduction of monotone images with consistent and desirable reference tones because three reference tone points, for warm, neutral, and cool tones, are disposed linearly in advance within a tone specifying area.

Note that the present invention can be embodied in a variety of forms; for example, the present invention can be embodied in the form of, for example, a printing method, a printing device, a printing control method, or a printing control device, in the form of a computer program by which to achieve the functions of those methods or devices, a recording medium in which is recorded the computer program, or a data signal that is equipped with the computer program incorporated into a carrier wave.

These and other objects, features, aspects, and advantages of the present invention will become more apparent from the following detailed description of the preferred embodiments with the accompanying drawings.

BRIEF DESCRIPTION OF THE DRAWINGS

FIG. 2 is a flow chart illustrating a procedure for performing printing of a monotone image;

DESCRIPTION OF THE PREFERRED EMBODIMENT

Figure 1:
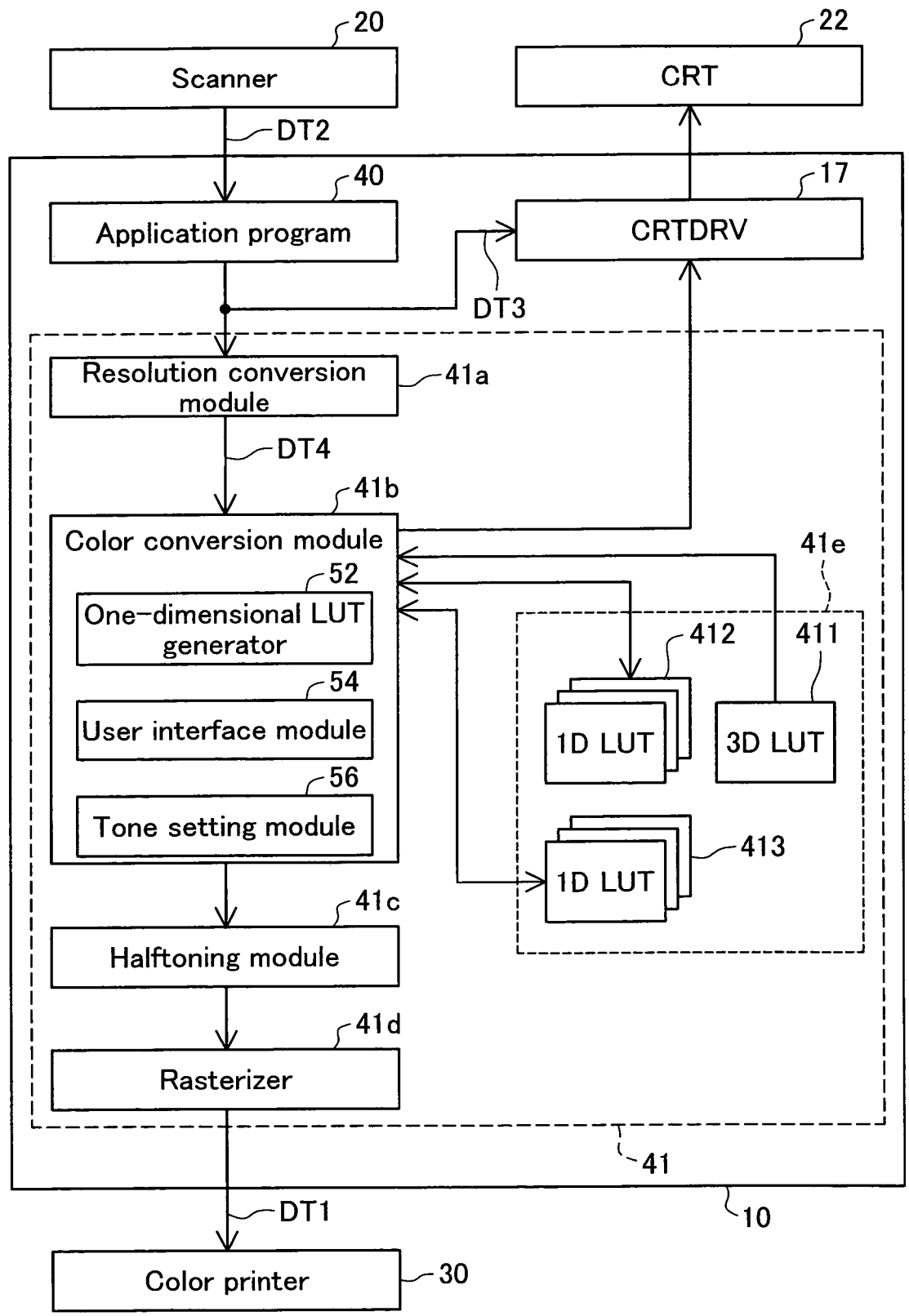
FIG. 1 is a block diagram illustrating an image processing system as an embodiment of the present invention.

FIG. 1 is a block diagram illustrating an image processing system as one embodiment of the present invention. This image processing system comprises a computer 10, a scanner 20, and a color printer 30.

The scanner 20 reads in image data DT2 from a source image, and outputs this image data to the computer 10. The computer 10 displays an image on the CRT 22 based on the image data DT2, and prints an image with the color printer 30. If the image that has been read-in is to be printed in color, RGB signals are usually used for the image data DT2.

In the computer 10, an application program 40 runs under a specific operating system. A CRT driver 17 and a printer driver 41 are included in this operating system. Image data DT1 is outputted from the printer driver 41 to the color printer 30.

The application program 40 is, for example, a photo touchup software, and performs processes such as touching up images on the image data DT2. Image data DT3, on which the processes provided by the application program 40 have been completed, is applied to the CRT driver 17 and printer driver 41.

When the application program 40 issues a print command, the printer driver 41 of the computer 10 converts the image data DT3, for which processing has been completed, into the print signal DT1 and outputs this print signal to the color printer 30. The print signal DT1 includes dot-formation data indicating dot formation states for plural types of ink, and sub-scan feed amounts.

The printer driver 41 comprises a resolution conversion module 41a, a color conversion module 41b, a color conversion table 41e, a halftoning module 41c, and a rasterizer 41d.

The resolution conversion module 41a produces a converted result DT4 by converting into the printing resolution the resolution of the processing results DT3 obtained from the application program 40. The color conversion module 41b uses the color conversion table 41e to determine the amounts of each ink used by the color printer 30 with respect to each pixel, based on the image data DT4 after the resolution conversion. The halftoning module 41c performs a so-called halftone process. The rasterizer 41d reorders the dot formation data into the order in which it is sent to the color printer 30, and outputs to the color printer 30, the print signal DT1 as the final print data.

The color conversion module 41*b* comprises a one-dimensional lookup table generator 52 for generating a one-dimensional lookup table for monotone image printing, a user interface module 54 for displaying a tone setting screen on a display device (a CRT 22), and a tone setting module 56 for setting a color tone or a tint of the monotone image according to the setting in the tone setting screen. The details of the functions of the color conversion module 41*b* will be described below.

A grey image to which a color tone is to be added may be a monochrome image in the narrow sense as it is if the image that has been read in from, for example, the scanner 20 is a monochrome image (black-and-white image). Conversely, even if the image that is read in from the scanner 20 is a color image, conversion or translation into a grayscale image can be performed by the application program 40. In other words, if the original image is a color image, the image is first translated into a monochrome image, and a monotone image is then obtained by adding a color tone.

The color conversion table 41*e* includes a three-dimensional table (LUT) 411 for use in color image printing, and one-dimensional lookup tables 412 and 413 for use in monotone image printing.

FIG. 2 is a flowchart illustrating a procedure for printing a monotone image, and FIGS. 3A through 3E illustrate the details of the procedure. In step T11 in FIG. 2, the gray image data (FIG. 3A) that is subject to print is generated by the application program 40. Note that instead of the application program 40, a gray image generating module (not shown) in the printer driver 41 may provide this process.

Figure 3A:
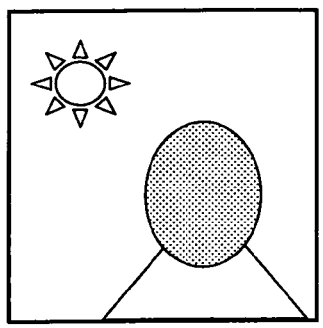
FIGS. 3A through 3E illustrate the details of a printing procedure for a monotone image.
Figure 3B:
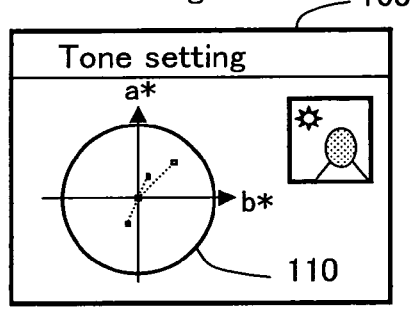
Figure 3C:
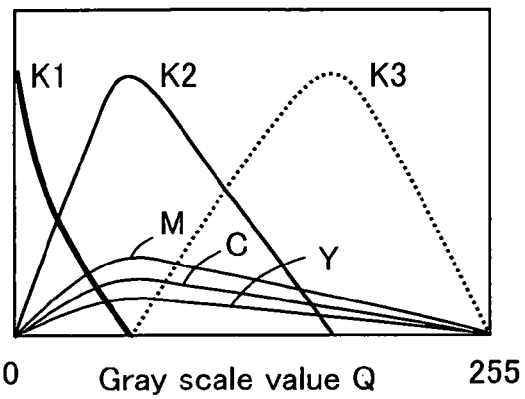
Figure 3D:
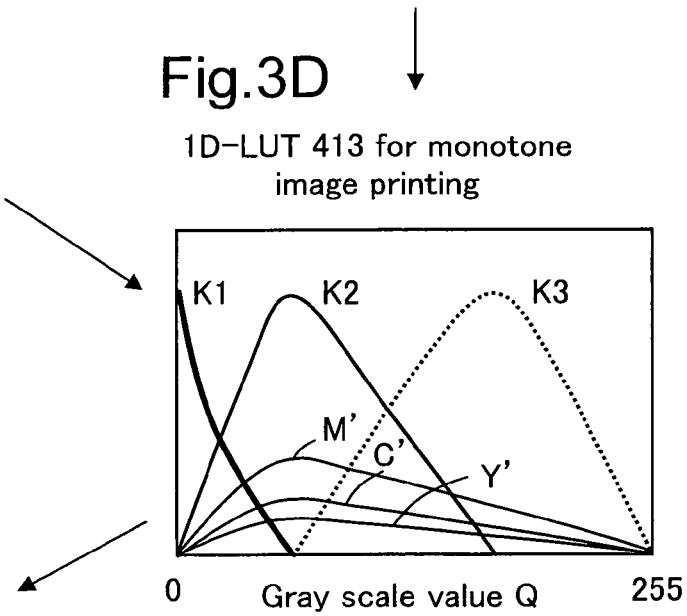
Figure 3E:
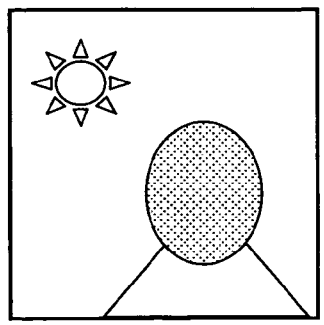

In step T12, the tone setting screen 100 (FIG. 3B) is displayed on the CRT 22 by the user interface module 54, and the user uses the color circle 110 within the tone setting screen 100 to set the color tone. The method of setting the tone using the color circle 110 will be explained in detail below. When the tone has been set, then, in step T13, the one-dimensional LUT generator 52 generates a one-dimensional lookup table 413 (FIG. 3D) for use in monotone image printing from a reference one-dimensional lookup table 412 (FIG. 3C). The reference one-dimensional LUT 412 is used when printing a neutral, monotone image, which is a monochrome image in the narrow sense. The horizontal axis is the lightness value Q of the grayscale image (hereinafter termed as the "grayscale value" or the "lightness value"), and the vertical axis is the amount of each ink used. Note that the greater the value for the grayscale value Q, the lighter the image is.

In the example in FIG. 3C, three types of achromatic inks with different lightness are used, and the amounts used thereof are indicated as K1, K2, and K3, in terms of ascending lightness order. Moreover, three chromatic inks of cyan, magenta, and yellow are used, and the amounts thereof are indicated as C, M, and Y, respectively. Printing with the ink amounts K1, K2, K3, C, M, and Y, which are read out from the reference one-dimensional lookup table 412 responsive to the grayscale value Q input, will reproduce images in a neutral tone. Note that the name, "one-dimensional LUT," means that the input value is one-dimensional (a grayscale value only). The output from the one-dimensional LUT is a plurality of values expressing the amounts of the various types of ink that are used in the monotone printing.

The one-dimensional LUT generator 52 (FIG. 1) generates a one-dimensional LUT 413 for use in printing a monotone image that has the color tone or tint set with the color circle 110. Note that the "color tone" or "tint" is a combination of "hue" and "saturation." The one-dimensional LUT 413 for monotone image printing shown in FIG. 3C is identical to the reference one-dimensional LUT 412 in terms of the amounts of the achromatic inks K1, K2, and K3, but is different from the reference one-dimensional LUT 412 in terms of at least one of the amounts of the chromatic inks C', M', and/or Y'. In other words, the one-dimensional LUT 413 for monotone image printing is generated by adjusting the amounts of chromatic inks C, M, and Y in the reference one-dimensional LUT 412.

The amounts of chromatic inks C', M', and Y' are determined according to, for example, equations (1a) through (1c), below:

$$C' = C \times Ck \quad (1a)$$

$$M' = M \times Mk \quad (1b)$$

$$Y' = Y \times Yk \quad (1c)$$

Here Ck, Mk, and Yk are adjustment values for the respective inks in order to reproduce the tone that is set using the color circle 110.

In step T14 in FIG. 2, the monotone image is printed with the tone that has been set. In this case, the color conversion module 41*b* uses the one-dimensional LUT 413 for printing, generated in step T13, to translate the data for the gray image to be printed into the amounts of the plural types of inks. After this, the print data DT1 that is to be supplied to the printer 30 is generated by the halftoning module 41*c* and the rasterizer 41*d*.

Figure 4:
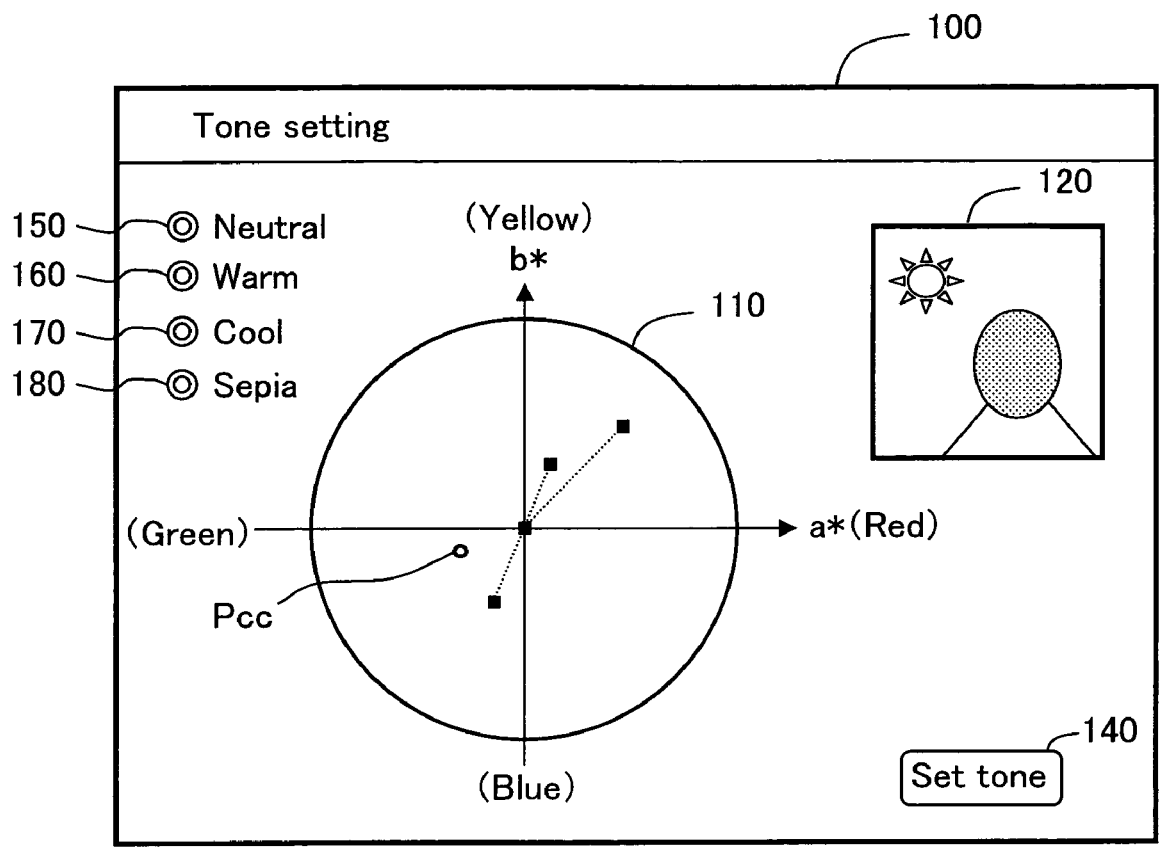
FIG. 4 is an explanatory diagram showing a close-up view of a tone setting screen.

FIG. 4 is an explanatory diagram showing a close-up view of the tone setting screen 100. The tone setting screen 100 includes a color circle 110, a sample image display area 120, a "Set tone" button 140, and four "Set reference tone" buttons 150, 160, 170, and 180. Each of the pixels in the color circle 110 is displayed with a tone or a tint that is set in advance according to the position thereof within the color circle 110. The tone of the monotone image is set according to the position of any given specified point Pcc that is specified within the color circle 110. The sample image display area 120 is an area for displaying a sample image in which a color tone has been added according to the specified point Pcc. This sample image is preferably a reduced image of the image to be printed (FIG. 3A), but may use, as a sample image, a specific standard image instead.

The "Set reference tone" buttons 150, 160, 170, and 180 are buttons for producing a monotone image wherein a neutral tone, a warm tone, a cool tone, or a sepia tone, respectively, have been set as a reference tone. When any of these buttons is selected, a special mark (for example, a black dot), indicating the selected reference tone, is displayed on the color circle 110. In this specification, the position of the mark that indicates the reference tone will be referred to as the "reference tone point." After any of the four reference tone buttons has been clicked, then when the "Set tone" button 140 is pushed, that reference tone is used as it is as the tone for the monotone image to be printed. On the other hand, when the tone is to the readjusted, then after one of the "Set reference tone" buttons has been pushed, another position in the color circle 110 will be specified. At this time, it is preferable that the reference tone mark is left as it is, and that another mark, different from the reference tone mark, indicates the position of the new specified point Pcc. Conversely, the reference tone mark may be removed and the new specified point Pcc mark may be displayed alone. Note that the monotone image tone may be set through simply specifying a position in the color circle 110, without selecting any "Set reference tone" button.

It is preferable that the plurality of reference tone points are disposed at specific positions within the color circle 110 regardless of the type of print paper used in printing. The positions for the plurality of reference tone points are stored in advance in the user interface module 54 (FIG. 1).

Figure 5:
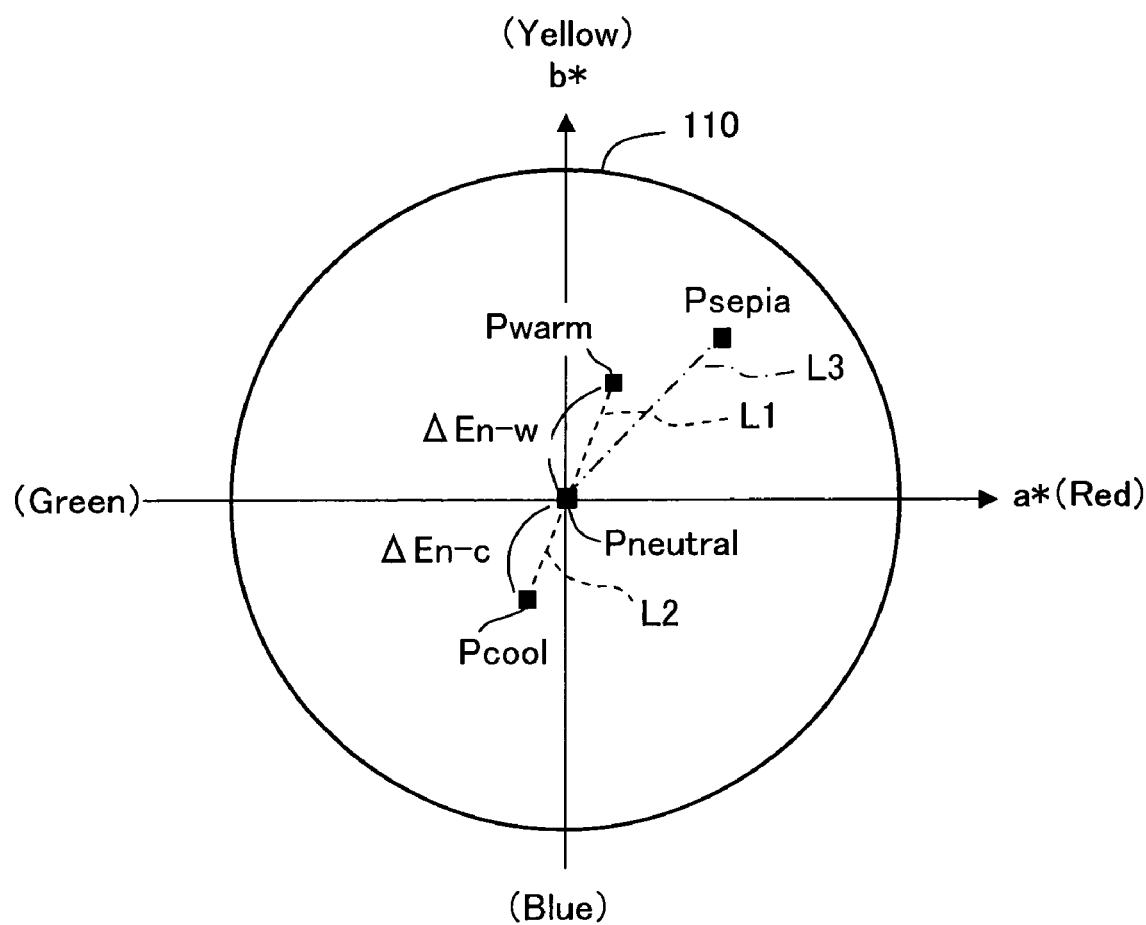
FIG. 5 is an explanatory diagram showing the positions of reference tone points in a color circle.

FIG. 5 is an explanatory diagram illustrating the positions of reference tone points within the color circle 110. In this example, the color circle 110 is defined on the a*-b* plane at L*=40 in the L*a*b* color space. In other words, any given point in the color circle 110 has a value of L*=40, where the a* and b* values are determined according to the position in the color circle 110.

The reference neutral tone point Pneutral is preferably set to a position of a*=b*=0. The reference warm tone point Pwarm is preferably set to a position wherein the values for both a* and b* are positive. The reference cool tone point Pcool is preferably set to a position where the values for both a* and b* are negative.

In the present embodiment, the reference tone points Pwarm, Pneutral, and Pcool for the warm, neutral, and cool tones are disposed linearly. The reason for this linearity is that these three reference tones appear to have relativity and consistency, which make it easy to reproduce monotone images with desirable color tones.

Note that when it comes to these three reference tone points Pneutral, Pwarm, and Pcool, a first line segment L1 and a second line segment L2 preferably form an angle of no more than 20°, and, particularly preferably, no more than 10°, where the first line segment L1 connects the reference warm tone point Pwarm and the reference neutral tone point Pneutral, and the second line segment L2 connects the reference neutral tone point Pneutral and the reference cool tone point Pcool. The use of this type of setup provides consistency in the three reference tones. Note that the term "the three reference tone points Pneutral, Pwarm, and Pcool are disposed linearly" includes also the case wherein the angle between these two line segments, L1 and L2 is not 0, but is instead sufficiently small.

The reference sepia tone point Psepia need not have consistency with the other three reference tones, and thus may be disposed in a position other than on the linear line of the three reference tone points Pneutral, Pwarm, and Pcool. For example, preferably the reference sepia tone point Psepia is set to a position such that the line segment L3 connecting the reference neutral tone point Pneutral and the reference sepia tone point Psepia will have an angle in the range of 10° to 40° from the first line segment L1 connecting the reference warm tone point Pwarm and the reference neutral tone point Pneutral, inclined towards the a* side. Note that the line segments L1 to L3 are abstractions, and preferably are not shown in the tone setting screen.

Note that the three reference tone points, Pneutral, Pwarm, and Pcool for the neutral, warm, and cool tones preferably are disposed along a straight line that has a slope that is closer to the b* axis than the a* axis on the a*-b* plane. This is for the reason described below. Because human perception has excellent acuity in regards to changes in the a* value, if there is a large change in the a* value when setting a tone of the monotone image, then the overall image may be tinted with red or green, potentially making the image not appearing as a monotone image. On the other hand, the acuity of human perception in regards to changes in the b* value is poor, and thus even if there is a change in the b* value that is larger than the change in the a* value when setting up a tone of the monotone image, then there is still a tendency for the monotone image to appear to have a natural color tone. As a result, disposing the three reference tone points Pneutral, Pwarm, and Pcool along a straight line that has a slope that is closer to the b* axis than the a* axis makes it possible to obtain a monotone image that has a desirable natural color tone.

In the example in FIG. 5, the distance ΔEn-w, or a color difference, between the reference warm tone point Pwarm and the reference neutral tone point Pneutral is set to be substantially equal to the distance ΔEn-c between the reference neutral tone point Pneutral and the reference cool tone point Pcool. Doing so enables the initial warm tone and the initial cool tone, as default values, to be given a sense of warmth and a sense of coolness that are equally offset from the neutral tone.

Note that the a* values and the b* values for the reference tones within the color circle 110 are values for the case wherein the print paper (also termed the "print medium") is pure white, without any coloration. Actually, different print paper each has its own degree of coloration, and when the colors of monotone images that have been printed are measured, normally the values are shifted, to some degree, from those shown or the a* values and the b* values in FIG. 5.

Figure 6A:
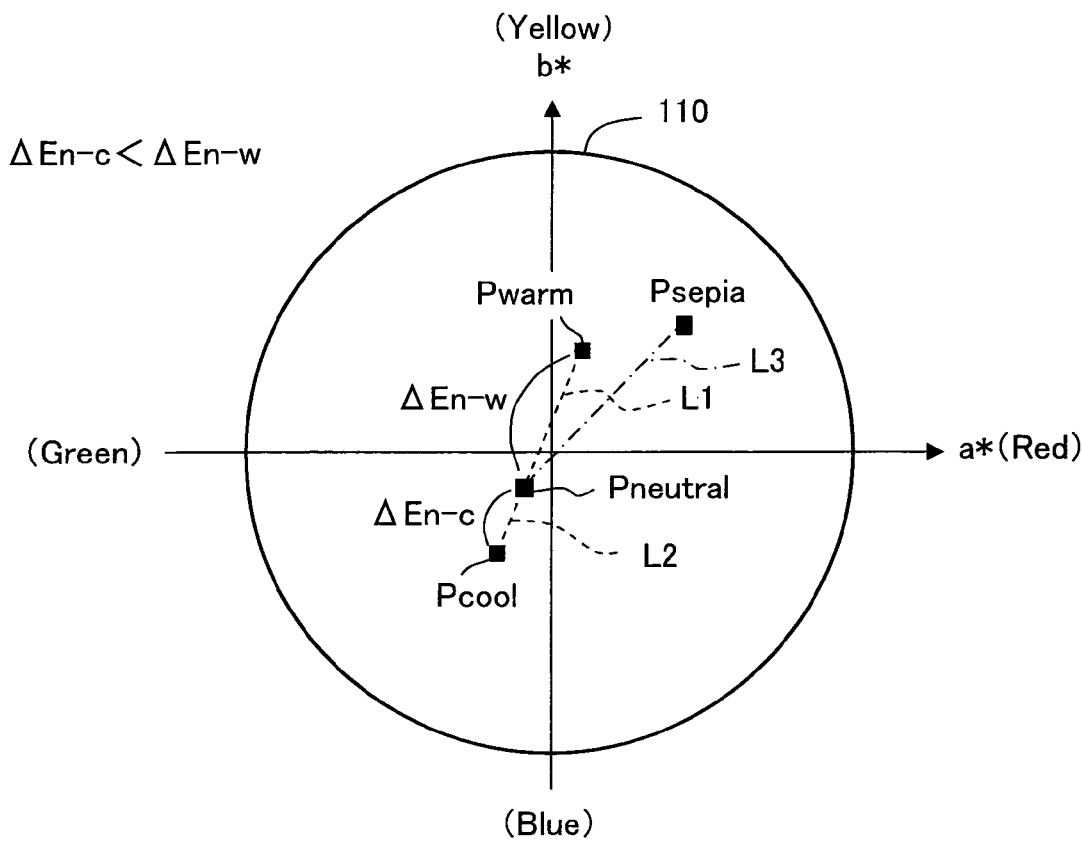
FIGS. 6A and 6B illustrate reference tones when printed on a light blue print medium.

FIG. 6A is an explanatory diagram illustrating the reference tones that are achieved by a monotone image printed on a print paper that has a light blue color (also termed a "light blue print medium"). In monotone images printed on light blue print media, the four reference tone points Pneutral, Pwarm, Pcool, and Psepia are shifted somewhat towards the bottom left (that is, towards the blue color side) from the positions in FIG. 5. The result is that both the a* value and the b* value of the tone Pneutral of the printed neutral monotone image are negative.

However, even in monotone image printed on light blue print media, the linearity of the three reference tone points Pneutral, Pwarm, and Pcool for the neutral, warm, and cool tones is maintained as is the case with the color circle 110 shown in FIG. 5. When the light blue print medium is used, the distance ΔEn-w between the reference warm tone point Pwarm and the reference neutral tone point Pneutral is preferably larger than the distance ΔEn-c between the reference neutral tone point Pneutral and the reference cool tone point Pcool. This type of disposition attains the visual effect of warmness for the warm tone and coolness for the cool tone on the light blue print medium.

Figure 6B:
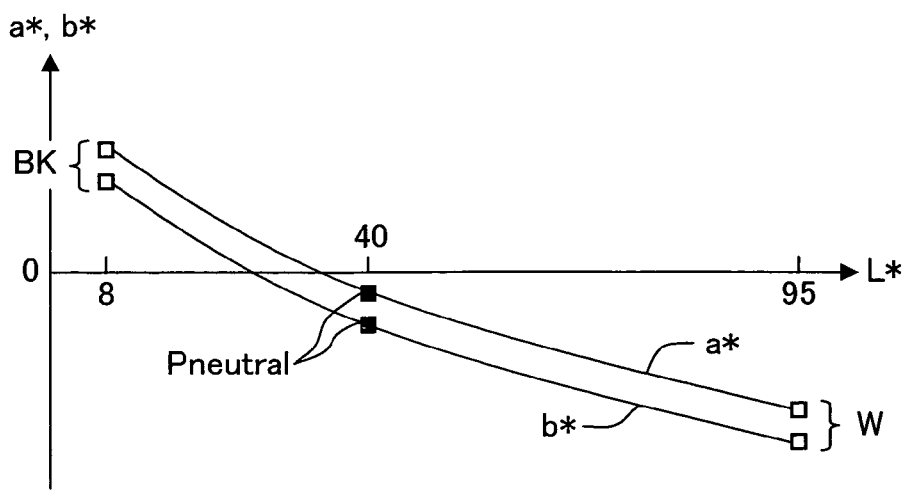

FIG. 6B is a graph illustrating the a* and b* values of the neutral monotone image printed on a light blue print medium as a function of the L* value. In this example, both a* and b* are negative at L*=40, and both a* and b* values gradually become smaller as the L* value increases. Here, L*=95 corresponds to paper white W, and L*=8 corresponds to a solid black BK. The a* and b* values for paper white W indicate that color of the print paper itself. The a* and b* values of the solid black BK indicate the color of the black ink itself, regardless of the print paper, and in this example, the a* and b* values for the black ink are assumed to be positive.

Figure 7A:
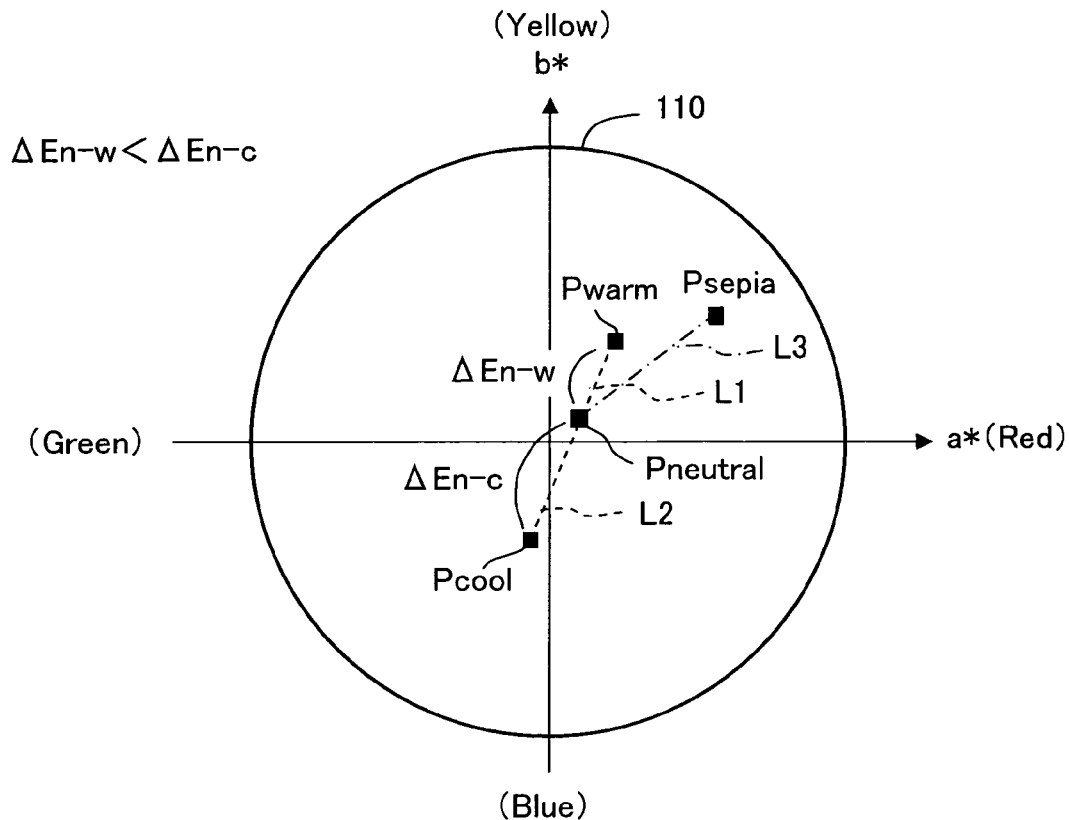
FIGS. 7A and 7B illustrate reference tones when printed on a light yellow print medium.

FIG. 7A is an explanatory diagram showing the reference tones achieved in a monotone image printed on a print paper that has a light yellow coloration (also termed a "light yellow print medium"). In the monotone images printed on the light yellow print medium, the four reference tone points Pneutral, Pwarm, Pcool, and Psepia are shifted somewhat to the upper right from the positions shown in FIG. 5. The result is that both the a* and the b* values for the neutral monotone image tint Pneutral are positive.

Even in monotone images printed on light yellow print media, the linearity of the three reference tone points Pwarm, Pneutral and Pcool for the warm, neutral, and cool tones is the same with the case in the color circle 110 shown in FIG. 5, and also the same with the case using the light blue print medium shown in FIG. 6A. However, when a light yellow print medium is used, the distance ΔEn-w between the reference warm tone point Pwarm and the reference neutral tone point Pneutral is preferably less than the distance ΔEn-c between the reference neutral tone point Pneutral and the reference cool tone point Pcool, which is the opposite of the case wherein the light blue print medium is used. This type of disposition attains the visual effect of warmness for the warm tone and coolness for the cool tone on the light yellow print medium.

Figure 7B:
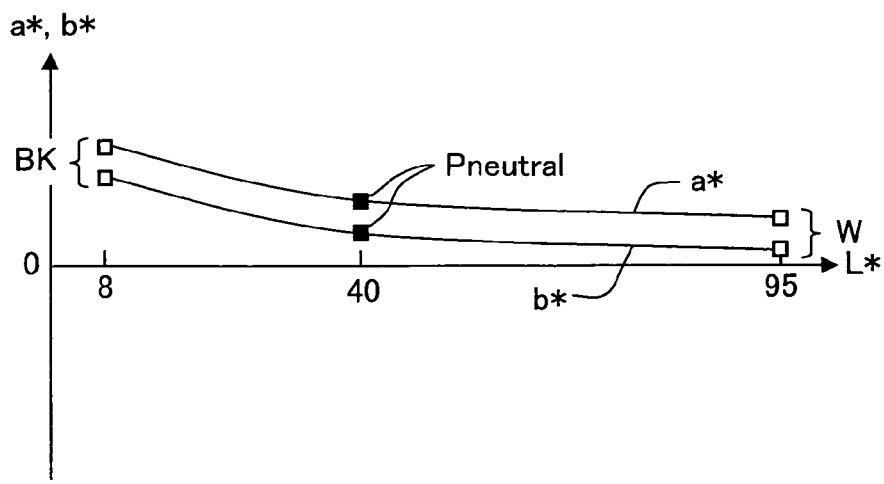

FIG. 7B is a graph illustrating the a* and b* values of the neutral monotone image printed on a light yellow print medium as a function of the L* value. In this example, the a* and b* values are both positive at L*=40. As with the case for the light blue print medium, the a* and b* values for paper white W indicate the color of the print paper itself. In this example, it is assumed that the a* and b* values for paper white W of the light yellow print medium are both positive. On the other hand, the a* and b* values of the solid black BK indicate the color of the black ink itself, regardless of the print paper, and in this example the a* and b* values of the black ink are assumed to be positive for both. The a* and b* values of the solid black BK are the same as those shown in FIG. 6B.

In this way, the three reference tone points Pwarm, Pneutral, and Pcool for the warm, neutral, and cool tones are disposed linearly in the above described embodiment, thus attaining monotone images with excellent consistency in relative tints between these three reference tones.

Note that the present invention is not limited to the embodiment and examples described above, but rather may be embodied in a variety of forms in a range that does not deviate from the intent thereof, and forms such as described below are also possible.

While in the above described embodiment the color tone for the monotone image is set using a color circle 110 having a circular shape, the area for specifying the color tone (termed the "tone specifying area") is not limited to being circular, but rather can have any given shape. Furthermore, while the use of a uniform color space, such as the L* a* b* color space is preferred as the color space for the tone specifying area, the use of other color spaces is also possible.

While in the above embodiment the six types of inks, C, M, Y, K1, K2, and K3 are used to perform the printing, the present invention may also be applied to cases wherein any given types of ink are used.

While in the above embodiment the monotone image is printed with an ink jet printer, the present invention may also be applied to other types of printers, such as laser printers. Moreover, the present invention may be applied to devices having color printing functions and monotone printing functions, and may be applied to facsimile machines and copy machines as well.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for setting a color tone for use in printing a monotone image, comprising the steps of:
   (a) displaying a tone setting screen that includes a tone specifying area for specifying a color tone for a monotone image with a single specification point; and
   (b) setting the color tone of the monotone image according to the position of the specification point which is specified in the tone specifying area, wherein
   (i) the tone specifying area is defined on an a*-b* plane in L*a*b* color space,
   (ii) the tone specifying area includes three reference tone points having a same L* value, the three reference tone points representing a warm tone, a neutral tone, and a cool tone, which are disposed linearly in advance within the tone specifying area, and
   wherein, when a light blue print medium is used in the printing, a distance ΔEn-w between the reference warm tone point and the reference neutral tone point is set larger than a distance ΔEn-c between the reference neutral tone point and the reference cool tone point.

2. A method according to claim 1, wherein an angle between a first line segment and a second line segment is no more than 20°, the first line segment joining the reference warm tone point and the reference neutral tone point, the second line segment joining the reference neutral tone point and the reference cool tone point.

3. A method according to claim 1, wherein the tone specifying area is defined on the a*-b* plane where L* is 40±10.

4. A method according to claim 1, wherein the three reference tone points for the warm tone, the neutral tone, and the cool tone are disposed along a straight line that has a slope that is nearer to the b* axis than to the a* axis of the a*-b* plane.

5. A method according to claim 1, further comprising the step of:
   (c) printing the monotone image with the set color tone on a print medium,
   wherein the three reference tone points for the warm tone, the neutral tone, and the cool tone which are to be reproduced in printed monotone images are disposed linearly on the a*-b* plane, regardless of color of the print medium.

6. The method according to claim 1, wherein
   when a light yellow print medium is used in the printing, a distance ΔEn-w between the reference warm tone point and the referent neutral tone point is set less than a distance ΔEn-c between the reference neutral tone point and the reference cool tone point.

7. A device for setting a color tone for use in printing a monotone image, comprising:
   a user interface module configured to display a tone setting screen that includes a tone specifying area for specifying a color tone for a monotone image with a single specification point; and
   a tone setting module configured to set the color tone of the monotone image according to the position of the specification point which is specified in the tone specifying area, wherein
   (i) the tone specifying area is defined on an a*-b* plane in L*a*b* color space,
   (ii) the tone specifying area includes three reference tone points having a same L* value, the three reference tone points representing a warm tone, a neutral tone, and a cool tone, which are disposed linearly in advance within the tone specifying area, and
   wherein, when a light blue print medium is used in the printing, a distance ΔEn-w between the reference warm tone point and the reference neutral tone point is set larger than a distance ΔEn-c between the reference neutral tone point and the reference cool tone point.

8. A device according to claim 7, wherein an angle between a first line segment and a second line segment is no more than 20°, the first line segment joining the reference warm tone point and the reference neutral tone point, the second line segment joining the reference neutral tone point and the reference cool tone point.

9. A device according to claim 7, wherein the tone specifying area is defined on the a*-b* plane where L* is 40±10.

10. A device according to claim 7, wherein the three reference tone points for the warm tone, the neutral tone, and the cool tone are disposed along a straight line that has a slope that is nearer to the b* axis than to the a* axis of the a*-b* plane.

11. A device according to claim 7, further comprising:
a print data generator configured to generate print data for use in printing the monotone image with the set color tone on a print medium,
wherein the three reference tone points for the warm tone, the neutral tone, and the cool tone which are to be reproduced in printed monotone images are disposed linearly on the a*-b* plane, regardless of color of the print medium.

12. The device according to claim 7, wherein
when a light yellow print medium is used in the printing, a distance ΔEn-w between the reference warm tone point and the reference neutral tone point is set less than a distance ΔEn-c between the reference neutral tone point and the reference cool tone paint.

13. A printer driver program, stored on a computer readable medium, for producing print data from image data, comprising:
a user interface module causing a computer to display a tone setting screen that includes a tone specifying area for specifying a color tone for a monotone image with a single specification point;
a tone setting module causing the computer to set the color tone of the monotone image according to the position of the specification point which is specified in the tone specifying area; and
a print data generator causing the computer to generate print data for use in printing the monotone image with the set color tone on a print medium, wherein (i) the tone specifying area is defined on an a*-b* plane in L*a*b* color space,
(ii) the tone specifying area includes three reference tone points having a same L* value, the three reference tone points representing a warm tone, a neutral tone, and a cool tone, which are disposed linearly in advance within the tone specifying area, and
wherein when a light blue print medium is used in the printing, a distance ΔEn-w between the reference warm tone point and the reference neutral tone point is set larger than a distance ΔEn-c between the reference neutral tone point and the reference cool tone point.

14. A printer driver program according to claim 13, wherein an angle between a first line segment and a second line segment is no more than 20°, the first line segment joining the reference warm tone point and the reference neutral tone point, the second line segment joining the reference neutral tone point and the reference cool tone point.

15. A printer driver program according to claim 13, wherein the tone specifying area is defined on the a*-b* plane where L* is 40±10.

16. A printer driver program according to claim 11, wherein the three reference tone points for the warm tone, the neutral tone, and the cool tone are disposed along a straight line that has a slope that is nearer to the b* axis than to the a* axis of the a*-b* plane.

17. A printer driver program according to claim 13, wherein the three reference tone points for the warm tone, the neutral tone, and the cool tone which are to be reproduced in printed monotone images are disposed linearly on the a*-b* plane, regardless of color of the print medium.

18. The printer driver program according to claim 13, wherein when a light yellow print medium is used in the printing, a distance ΔEn-w between the reference warm tone point and the reference neutral tone point is set less than a distance ΔEn-c between the reference neutral tone point and the reference cool tone point.

* * * * *